United States Patent [19]

Butsch

[11] 4,071,866

[45] Jan. 31, 1978

[54] DISC RECORDER DRIVE FOLLOWER ASSEMBLY

[75] Inventor: Otto R. Butsch, Ann Arbor, Mich.

[73] Assignee: Sycor, Inc., Ann Arbor, Mich.

[21] Appl. No.: 778,143

[22] Filed: Mar. 16, 1977

[51] Int. Cl.² .................. G11B 21/08; F16H 55/18
[52] U.S. Cl. ................................... 360/106; 74/409
[58] Field of Search ............... 360/106, 78; 74/89.15, 74/424.8, 409

*Primary Examiner*—Robert S. Tupper
*Attorney, Agent, or Firm*—Price, Heneveld, Huizenga & Cooper

[57] ABSTRACT

A drive follower assembly for a disc recorder of the type including a frame supporting a lead screw and a guide rod positioned in vertically spaced, parallel relation to the load screw is disclosed. The drive follower includes a one-piece carriage defining a longitudinal bore. A first, hollow, cylindrical, internally threaded follower is disposed within the bore and held against rotation and longitudinal movement relative to the body. A second, internally threaded adjustment member is loosely held within the bore and engaged by the lead screw. A coil spring is positioned between the follower member and the adjustment member to provide a snug fit on the lead screw and prevent decoupling. Provision is made for holding the adjustment member against rotation relative to the body yet permitting relative rotation for adjusting the initial preload of the spring.

19 Claims, 5 Drawing Figures

DISC RECORDER DRIVE FOLLOWER ASSEMBLY

BACKGROUND OF THE INVENTION

This invention relates to data recorder/reproducer devices of the type employing a limp, flexible disc media.

These data recorder devices typically include a lead screw or worm driven by a stepper motor for translating the recording head relative to the disc. A carriage assembly supporting the head is threadably engaged by the lead screw so that rotation of the lead screw results in translation of the carriage relative thereto. In one such prior recorder, the carriage assembly defines an internally threaded bore nut. The threaded portion of the bore is engaged by the lead screw to translate the carriage. An adjustment member is positioned longitudinally of the threaded bore on the lead screw and a coil spring is positioned between the adjustment member and the bore to preload these members. Pressure is exerted on the lead screw from both sides to compensate for backlash and to prevent decoupling. The adjustment member includes a hex shaped stop which engages the underside or edge of the carriage.

In the assembly of such a lead screw drive and follower carriage assembly, the initial preload of the spring must be adjusted. With the prior device having the hex stop the carriage must be disassembled from the lead screw to rotate the adjustment member. Also, with this prior device it was felt necessary to coat the lead screw with an anti-friction material such as Teflon to improve the start-up frictional characteristics.

It is important that the carriage assembly not become loose on or rock about the lead screw during use or errors in tracking will result. To provide rotational stability, this carriage includes a guide receiving portion defined by upstanding fingers engaging the guide. Due to normal manufacturing tolerances, however, slop or looseness has resulted as well as undesirable frictional characteristics.

A need exists for a relatively simple lead screw follower head carriage for a disc recorder whereby the assembly process is simplified, adjustment is easily made of the initial spring load of the anti-backlash and antidecoupling spring, looseness is essentially eliminated and better frictional characteristics are obtained.

SUMMARY OF THE INVENTION

In accordance with the present invention a unique disc recorder drive follower assembly is provided which is easily manufactured, easily assembled on a lead screw and which is readily adjustable during assembly or in the field. Essentially, the follower includes a one-piece carriage defining a longitudinal bore, and a spaced, parallel glide dimensioned to receive a guide rod supported in a spaced, parallel relationship with the lead screw. An internally threaded follower is held within the bore and is threadably engaged by the lead screw. An internally threaded adjustment member is disposed within the bore in a longitudinally spaced relationship from the follower and also is threadably engaged by the lead screw. A spring is positioned between the follower and the adjustment member thereby exerting pressure on both sides of the lead screw and compensating for backlash and preventing decoupling of the follower from the lead screw during operation. Provision is made for releasably holding the adjustment member against rotation relative to the body so that the positioning of the adjustment member on the lead screw relative to the follower may be varied after assembly without the necessity for removing the carriage from the lead screw. Further, the follower is held within the body of the carriage against both longitudinal and rotational movement relative to the body.

In narrower aspects of the invention, the carriage body is fabricated from a rigid, plastic material while the followers are fabricated from a low friction plastic material. Further, a low friction plastic member is spring loaded against the guide rod and received within the glide passage to provide better frictional characteristics for start-up and to compensate for manufacturing tolerances.

DETAILED DESCRIPTION OF THE PREFERRED EMBODIMENT

Figure 1:
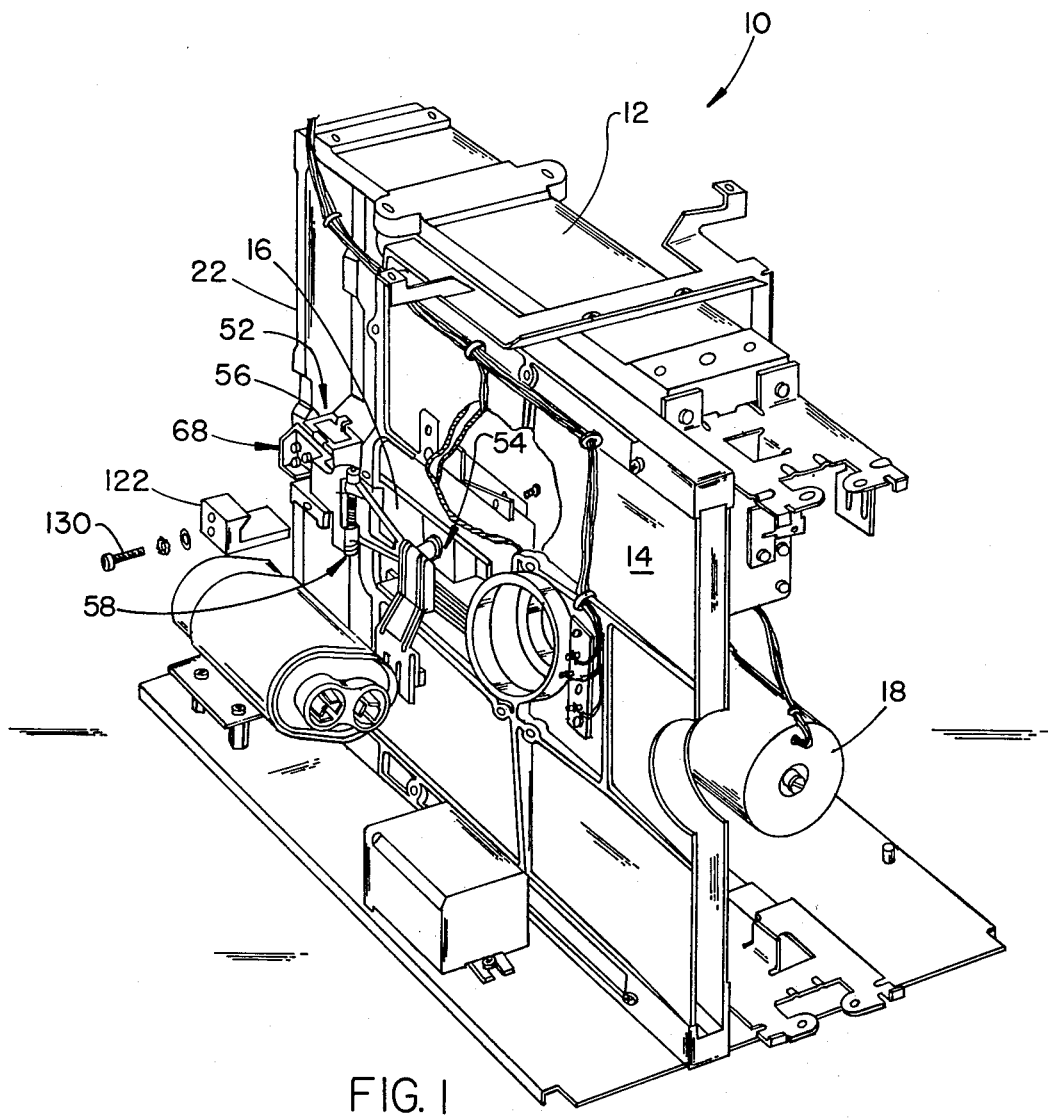
FIG. 1 is a fragmentary, perspective view of a portion of a disc recorder incorporating the carriage or follower assembly in accordance with the present invention.

A portion of a data recorder device of the type employing "floppy", flexible disc media and incorporating a unique drive follower assembly in accordance with the present invention is illustrated in FIG. 1 and generally designated 10. As shown therein, the recorder includes a generally rectangular, four-sided frame 12 to which are attached the various components of the recorder. The recorder includes at least one disc receiver or holder 14 pivotally secured to the frame 12. The disc holder or receiver includes a slot 16 extending therethrough. The slot is positioned so as to expose the disc recording medium opening through a slot in a protective envelope. A more detailed description of the type of disc recording media and the disc recorder per se may be found in U.S. Pat. No. 3,668,658; U.S. Pat. No. 3,678,481 and U.S. Pat. No. 3,913,137.

Figure 2:
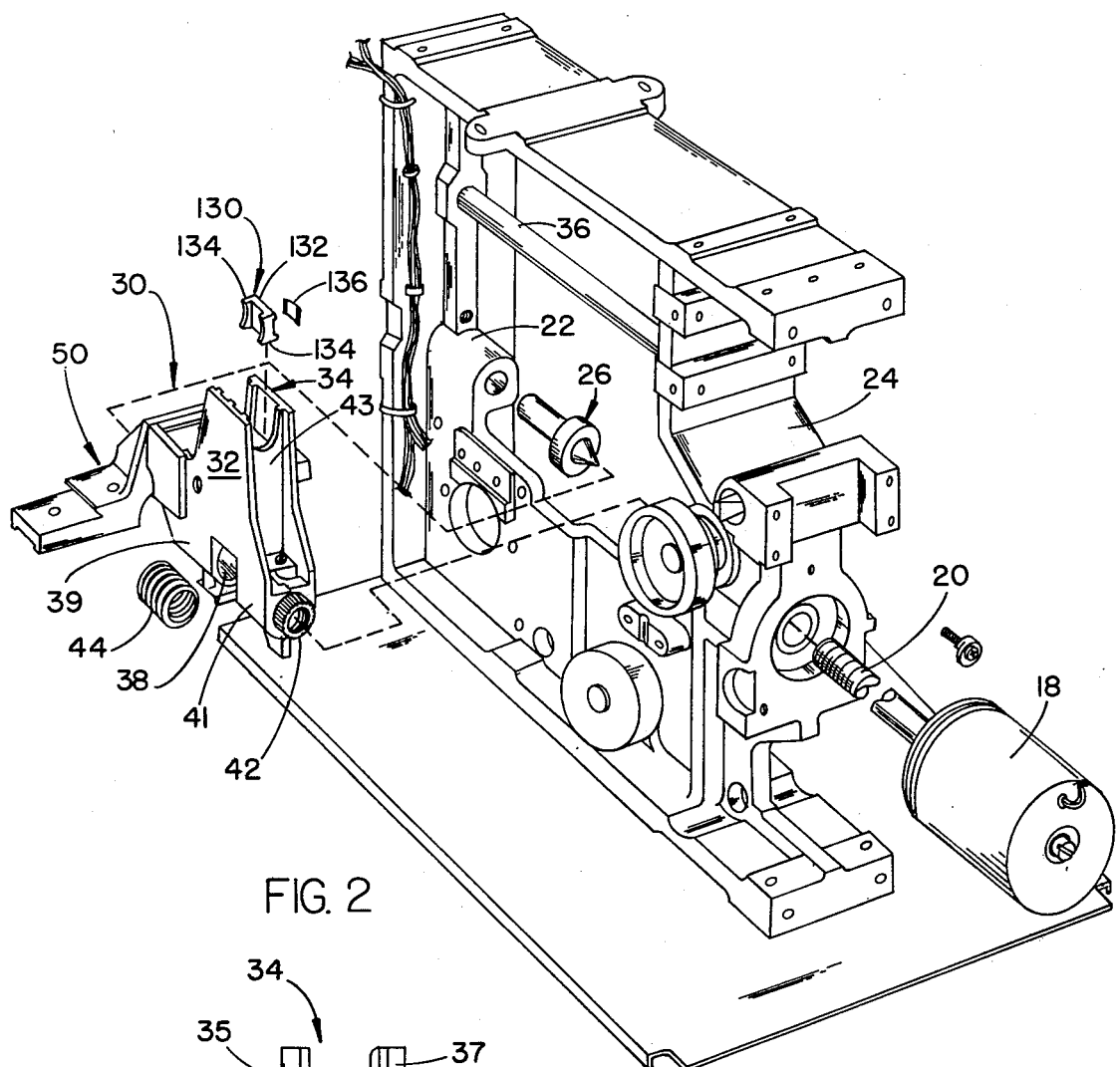
FIG. 2 is a fragmentary, partially exploded, perspective view of the frame of a disc recorder and including a lead screw drive and the drive follower in accordance with the present invention.

As seen in FIG. 2, the disc recorder includes a stepper motor 18 for rotating an integral lead screw or worm 20. The lead screw extends between side members 22, 24 of the frame and is supported at one end by a spring loaded, live center 26. A more detailed description of the stepper motor, lead screw drive including the live center 26 may be found in Applicant's commonly owned, copending application, Ser. No. 788,144 filed on even date herewith and entitled DISC RECORDER DRIVE.

Figure 4:
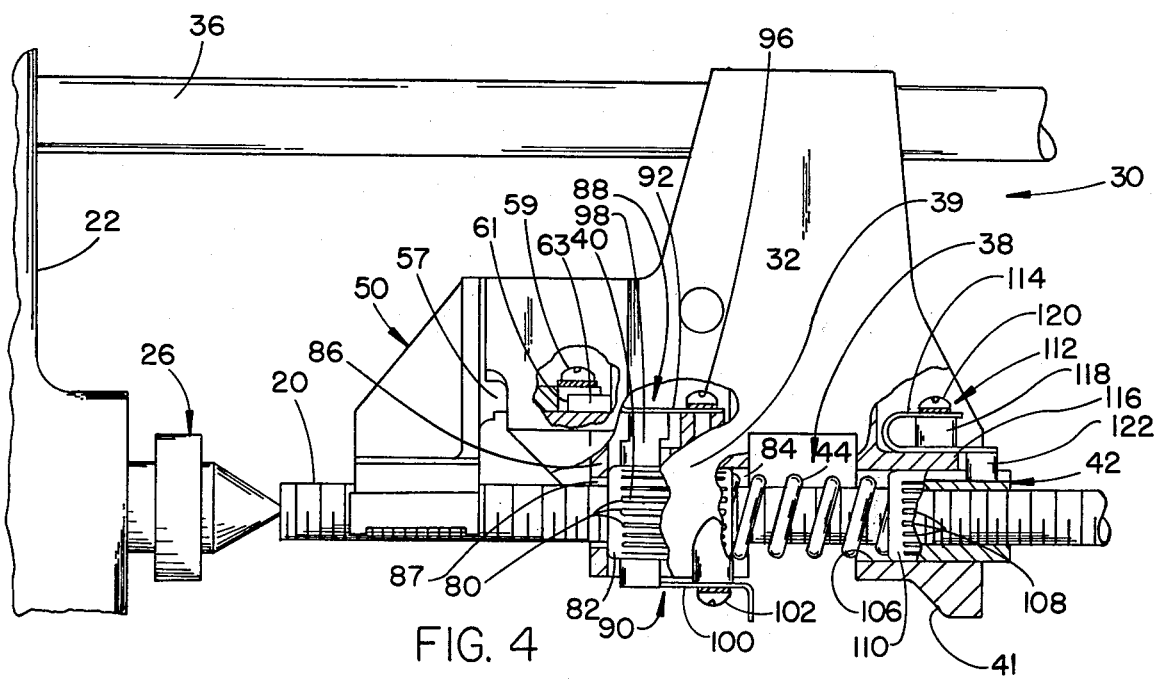
FIG. 4 is a fragmentary, partially sectioned, front elevational view of the carriage assembly installed on the lead screw.
Figure 5:
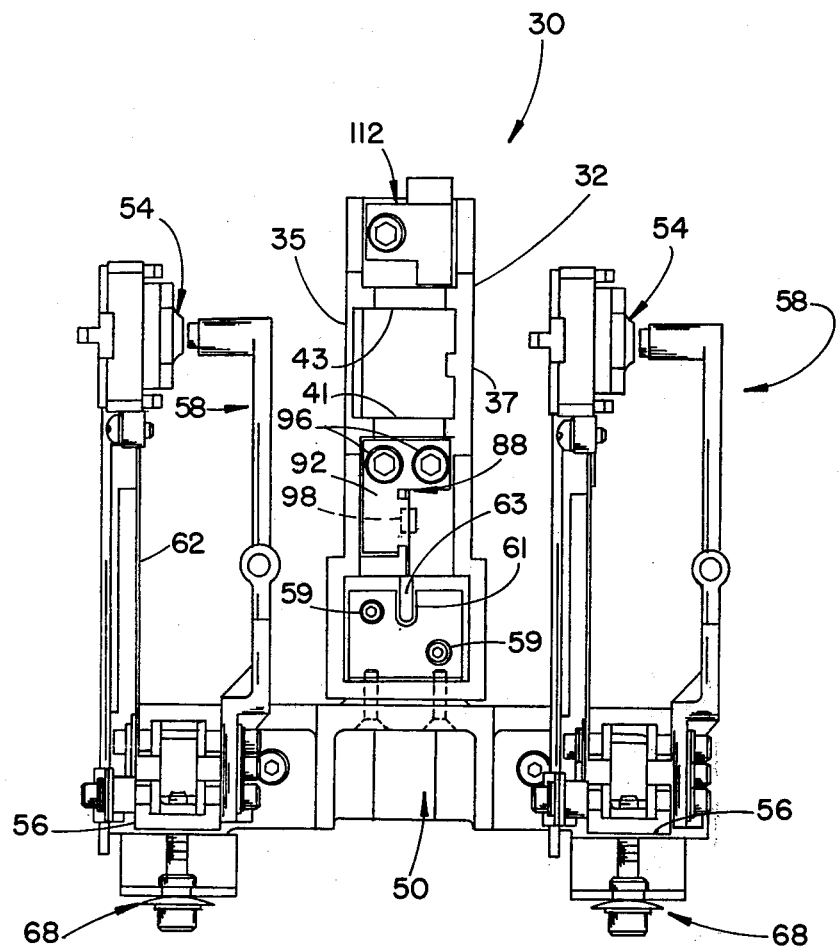
FIG. 5 is a top, plan view of the carriage assembly supporting a pair of magnetic head units.

As seen in FIGS. 2 and 4, the lead screw 20 threadably engages and translates a carriage or follower assembly 30. The carriage includes a molded plastic body member 32. The body member includes a generally U-shaped glide portion 34 along one lateral edge adapted to receive or ride on a guide rod 36. The glide is defined by the sidewalls 35, 37 of the body and intermediate end walls 41, 43 (FIG. 5). The guide rod extends between the frame members 22, 24 in spaced parallel relationship with the lead screw or worm 20.

The body member 32 of the carriage further includes a longitudinally extending bore 38 including a first portion defined by a boss 39 within which is disposed a follower nut 40 and a second portion defined by a boss 41 within which is disposed an adjustment member 42. The follower nut 40 and the adjustment member 42 are internally threaded and ride on the lead screw 20. A resilient biasing means 44, preferably a coil spring, is positioned between the follower nut 40 and the adjustment member 42 to compensate for backlash on the lead screw and to prevent decoupling of the carriage with respect to the lead screw.

Figure 3:
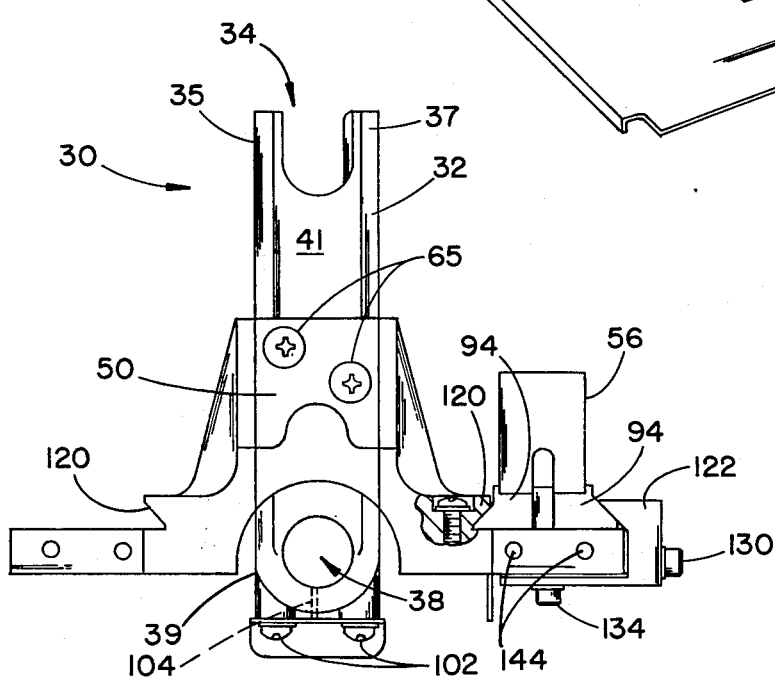
FIG. 3 is an end, elevational view of the carriage assembly supporting a cross arm extender in accordance with the present invention.

As seen in FIG. 2, a transversely extending cross arm or carriage extender 50 is secured to the body 32 of the carriage 30. The extender 50 is generally perpendicular to the body portion 32 of the follower and extends outwardly to a point generally in line with the disc receiver or holder 14. A typical disc recorder will include a pair of the disc receivers or holders 14 illustrated in FIG. 1. Therefore, the arm will extend outwardly on both sides of the carriage. It is preferred that the arm 50 be cast from metal, such as aluminum and then machined to the dimensions specified. As best seen in FIGS. 4 and 5, the extender includes an outwardly extending flange 57 extending into a cavity defined by the body member 32. Flange 57 defines a slot 61 within which a tab 63 integral with the body 32 extends. The flange is secured to the body member within the cavity by suitable fasteners 59 and is secured to an end wall of the body member by suitable fasteners 65 (FIG. 3). The cast metal carriage extender possesses significant advantages over molding an extender integral with the carriage. The cast metal which is preferably an aluminum alloy such as Precedent 71A-TS provides a very rigid cross arm. Further, the use of a machined casting alleviates the tolerance problems experienced with molding such an extender from a plastic material.

As seen in FIGS. 1 and 5, head assemblies 52 are adjustably positioned on the carriage extender. Each head assembly 52 includes a slidably adjustably positionable support mount 56. A magnetic head 54 is supported from the mount 56 by a flexible arm 62. A pressure back-up pad assembly 58 is also carried by the mount 56. The support mount 56 includes dovetail flanges or glides 94. One of the glides 94 is received within a dovetail track or guide 120 formed in the extender. One of the glides is held by a dovetail clamp 122 (FIG. 3). The dovetail clamp 122 is secured to the end of the extender by fasteners 130, 134. An adjustment screw assembly 68 (FIG. 5) is secured to the extender by fasteners extending through apertures 144 (FIG. 3). A more detailed description of the head assemblies as well as the adjustable feature may be found in Applicant's copending, application, Ser. No. 778,137, entitled HEAD POSITIONER FOR DISC RECORDERS, filed on even date herewith.

As set forth above, prior disc recorder follower assemblies have been fabricated from a rigid plastic material and the lead screw or worm drive has been coated with an anti-friction material, such as Teflon. Also, the adjustment of the initial preload of an anti-backlash and anti-decoupling spring has required substantial disassembly of the carriage from the lead screw. The carriage assembly in accordance with the present invention permits adjustment of the preload without disassembly of the carriage or removal from the lead screw and further, eliminates the need for providing a specially coated load screw to reduce friction during operation.

As seen in FIGS. 4 and 5, the follower member or nut 40 is of a generally cylindrical configuration and is internally threaded so as to threadably engage and ride on the lead screw 20. The peripheral surface of the member 40 is provided with a plurality of radially spaced, outwardly opening longitudinally extending slots 80. The slots extend from the forward end as viewed in FIG. 4 of the member rearwardly and terminate adjacent the rear end thereof to define an end flange 82. The bore 38 which extends through the body 32 includes a first portion 84 within which the follower nut 40 is disposed. The end of the bore is closed off by a stop or circular flange 86 having a through aperture 87 formed therein of a diameter less than the diameter of the bore portion 84. The follower member 40 is held against relative movement with respect to the body 32 both longitudinally and rotationally by a pair of retainer clips 88, 90. Retainer clip 88 includes a first, planar portion 92 secured to a boss 94 molded integral with the body 32 by suitable fasteners 96. Also, the clip 88 includes a depending, tab-like portion 98. The tab portion 98 extends through a slot formed in the body and is disposed within one of the grooves 80 adjacent the flange portion 82 of the follower 30. Similarly, the retaining clip 90 includes a planar portion 100 and is secured to the body by suitable fasteners 102. A vertically extending tab 104 extends through the bottom of the body 32 and is disposed within one of the grooves 80. In this manner, the circular flange or end portion 82 of the follower member 40 is held within the bore portion 84 between the circular flange 86 and the tabs 98, 104 of the retaining clips 88 and 90. Longitudinal and rotational movement of the follower 40 is prevented.

The adjustment member 42 as seen in FIG. 4 is disposed within a second portion 106 of the bore 38. Member 42 similarly is of generally cylindrical configuration and includes a plurality of radially spaced, longitudinally extending grooves 108 opening outwardly through the peripheral surface thereof. The grooves extend from the forward end of member 42 and terminate adjacent their rear end to define an end wall or cylindrical flange portion 110. Spring 44 abuts against the forward face of follower nut 40 and the rear face or cylindrical flange 110 of the adjustment member 42. A shiftable, resilient clip means 112 is secured to the body 32 and is provided to prevent rotation of the member 42 relative to the body 32. The member is formed from a resilient, spring-like metal and has a generally U-shape in side elevation including a first leg 114 and a second leg 116. Leg 114 is secured to a boss 118 by a suitable fastener 120. Leg 116 includes a depending, vertically oriented tab 122 which extends through a slot in the body 32 and is disposed within one of the longitudinal grooves 108. Since the clip 112 is fabricated from a resilient material, the leg 116 may be grasped and manually shifted upwardly thereby releasing the follower 42 permitting rotation of the follower on the lead screw relative to the body 32 and relative to the follower nut 40 to adjust the initial preload of the spring 44. As a result, adjustment of the spring preload may be made during assembly or in the field without removal of the carriage assembly from the lead screw as has heretofore been required.

By employing a separate follower member or nut 40 and a separate adjustment member 42, the body 32 may be fabricated from a rigid plastic material. It is presently preferred that the body 32 be molded from a 40% glass-filled Lexan 414 material. This material has been found to have the desired strength and rigidity for proper reliability and operation in the disc recorder. It is preferred that the follower 40 and the adjustment member 42 be molded from a plastic material having low frictional characteristics such as Delrin AF which is a polytetrafluoroethylene filled plastic. As a result, better frictional characteristics for start-up are obtained. Also, quality control problems are eliminated with respect to the specially coated lead screw heretofore used and assembly is simplified.

As seen in FIG. 2, the glide structure 34 of the carriage assembly 30 is provided with a bushing or slide block 130 having a generally rectangular shape including a base 132 and sidewalls 134. The sidewalls 134 are notched so that they match the configuration of the guide rail 36. The bushing 130 is dimensioned to be received within the U-shaped area defined by the upper portion of the body 32 between the intermediate walls 41, 43. A leaf spring 136 is sandwiched between the bushing or block 130 and the sidewall of the body 32. It is preferred that the bushing 130 be fabricated from a low frictional characteristic plastic material such as Delrin AF. Bushing 130 therefore engages the guide rail 36. The leaf spring 136 biases this member against the guide rail to thereby take up any slop resulting from the dimensional tolerances encountered in the fit between the glide rail 36. Rotational stability is obtained and adverse friction is eliminated.

In assembling the carriage or follower assembly in accordance with the present invention, the follower 40 is inserted within the bore 38 and the clips 88, 90 are secured to the body 32. The spring 44 is disposed between the bosses 39, 41 within bore portions 84, 106. The adjustment member 42 is then rotated onto the lead screw and the lead screw is rotated onto the follower nut 40. The adjustment member 42 may then be rotated relative to the lead screw and the body 32 so that the proper preload of the spring 44 is obtained. The leg 116 and clip 112 may be held up manually to perform this operation. Once the desired preload is obtained, the leg 116 is released and the tab 122 is disposed in one of the grooves 108. The spring positioned between follower 40 and adjustment follower 42 applies pressure to both sides of the lead screw insuring a snug fit. Also, the spring 44 assists in preventing decoupling of the followers during operation of the stepper motor. A rigid, snugly positioned and held carrier is therefore provided while the lubrication and anti-friction advantages of a low friction plastic follower are obtained. The carrier has increased rotational stability and manufacturing tolerances are readily accommodated. In view of the above description various modifications will undoubtedly become apparent to those of ordinary skill in the art that would not depart from the inventive concepts disclosed. It is expressly intended, therefore, that the above description should be considered as that of the preferred embodiment only. The true spirit and scope of the present invention will be determined by reference to the appended claims.

The embodiments of the invention in which an exclusive property or privilege is claimed are defined as follows:

1. A head carriage for a disc recorder of the type including a frame supporting a lead screw by which said carriage is translated and a guide rod positioned in vertically spaced, parallel relation to the lead screw, said head carriage comprising:
   a one-piece body defining a longitudinal bore dimensioned greater than the lead screw and including a stop at one end, said body further defining a glide passage dimensioned to receive the guide rod;
   an internally threaded follower held within said bore and threadably engaged by the lead screw, said follower contacting the stop at one end and held against rotation relative to said body;
   an internally threaded adjustment member disposed within said bore longitudinally spaced from said follower and threadably engaged by said lead screw;
   a spring positioned between said follower and said adjustment follower, biasing said follower and said adjustment member apart to prevent backlash; and
   manually shiftable means carried by said body and engaging said adjustment member for normally holding said adjustment member against rotation relative to said carriage on said lead screw and being shiftable for permitting rotation of said adjustment member on said lead screw towards and away from said follower to adjust the spring preload.

2. A head carriage as defined by claim 1 wherein said adjustment member is generally cylindrical in cross section and defines a plurality of radially spaced, outwardly opening, longitudinal grooves.

3. A head carriage as defined by claim 2 wherein said manually shiftable means comprises a one-piece resilient member secured to said body and including a tab extending into one of said longitudinal grooves of said adjustment member.

4. A head carriage as defined by claim 3 wherein said follower is generally cylindrical in cross section and includes a plurality of radially spaced, outwardly opening, longitudinal grooves extending along a portion thereof and said carriage further includes a retainer clip including a first portion secured to said body and a second portion extending into one of said longitudinal grooves of said follower whereby rotation of said follower relative to said body is prevented and said follower is held against longitudinal movement relative to said body.

5. A head carriage as defined by claim 4 wherein said carriage further includes:
   a block disposed within said glide passage and having a surface engaging said guide rod; and
   resilient means engaging said block and resiliently biasing said block against said guide rod.

6. A head carriage as defined by claim 5 wherein said follower and said adjustment member are formed from a plastic material having low frictional characteristics when compared with said body.

7. A head carriage as defined by claim 6 wherein said carriage body is formed from a rigid, glass-filled plastic.

8. A head carriage as defined by claim 7 wherein said block is formed from a plastic material having a low frictional characteristics when compared with said body.

9. A head carriage as defined by claim 8 wherein said plastic having low frictional characteristics from which said follower and said block are formed is a polytetrafluoroethylene filled plastic.

10. An improved head carriage for a disc recorder, said carriage being of the type including a body defining a longitudinal bore, an internally threaded, follower nut disposed in said bore and adapted to ride on a lead screw and improved anti-backlash means comprising:
- a hollow, cylindrical, internally threaded member disposed within said bore and adapted to ride on the lead screw;
- a coil spring positioned between said follower nut and said cylindrical member to prevent backlash; and
- a shiftable member carried by said body and including a portion shiftable from a first position engaging said cylindrical member to prevent rotation of said cylindrical member relative to said body to a second position permitting selective movement of said cylindrical member towards and away from said follower nut to adjust the spring preload.

11. An improved head carriage as defined by claim 10 wherein said cylindrical member defines a plurality of radially spaced, outwardly opening longitudinal slots positioned around the periphery thereof.

12. An improved head carriage as defined by claim 11 wherein said shiftable member comprises a generally U-shaped resilient piece having a first leg secured to said body and a second leg including a depending planar tab, said member secured to said body so that said tab normally extends into one of said grooves when said member is in said first position and said tab is shiftable out of said groove to said second position.

13. A drive for the head of a disc recorder of the type using a flexible disc and including a frame, said drive comprising:
- a lead screw supported by said frame;
- a guide rail supported by said frame in spaced, parallel relationship to said lead screw;
- a carriage means engaged by said lead screw to be translated thereby for supporting the head, said carriage means comprising:
- a one-piece, molded body having a bore through which said lead screw extends and glide means for riding on said guide rail;
- a first hollow member defining an internally threaded passage held within said bore, said first member threadably engaging said lead screw so as to be translated by said lead screw;
- a second hollow member freely rotatably within said bore for movement towards and away from said first member, said second member being internally threaded and threadably engaging said lead screw to be translated thereby;
- resilient biasing means engaging said first member and said second member for biasing said members apart to compensate for backlash between said internally threaded member and said lead screw; and
- anti-rotation means carried by said body and engaging said second member for preventing rotation of said second member relative to said body, said anti-rotation means being shiftable to a position permitting rotation of said second member on the lead screw towards and away from said first members.

14. A drive as defined by claim 13 wherein said second member comprises an elongated, cylindrical piece having a plurality of radially spaced, longitudinally extending, grooves opening through the periphery thereof.

15. A drive for the head of a disc recorder of the type defined by claim 14 wherein said anti-rotation means comprises a clip carried by said body and including a shiftable planar portion disposed in one of said grooves.

16. A drive as defined by claim 15 wherein said first member is held by a pair of retaining clips carried by said body and engaging said first member to prevent rotation of said first member relative to said body.

17. A drive as defined by claim 16 wherein said resilient biasing means comprises a coil spring surrounding said lead screw and positioned between said first member and said second member whereby pressure is applied to both sides of said lead screw resulting in a snug fit of said members on said lead screw.

18. A drive as defined by claim 13 wherein said one-piece body is molded from a rigid, glass-filled plastic and said first and second members are formed from a plastic having lower frictional characteristics than said body.

19. A drive as defined by claim 17 wherein said one-piece body is molded from a rigid, glass-filled plastic and said first and second members are formed from a polytetrafluoroethylene filled plastic.

* * * * *